(12) United States Patent
Fries et al.

(10) Patent No.: US 8,069,341 B2
(45) Date of Patent: Nov. 29, 2011

(54) UNIFIED PROVISIONING OF PHYSICAL AND VIRTUAL IMAGES

(75) Inventors: Robert M. Fries, Kirkland, WA (US); Stuart Schaefer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 11/771,371

(22) Filed: Jun. 29, 2007

(65) Prior Publication Data

US 2009/0006534 A1    Jan. 1, 2009

(51) Int. Cl.
*F21F 15/177* (2006.01)

(52) U.S. Cl. .......... 713/1; 713/2; 713/100; 717/176

(58) Field of Classification Search .......... 362/218; 713/1, 2, 100; 717/176
See application file for complete search history.

(56) References Cited

U.S. PATENT DOCUMENTS

| | | | |
|---|---|---|---|
| 6,715,031 B2 | 3/2004 | Camble et al. | |
| 6,857,069 B1 | 2/2005 | Rissneyer et al. | |
| 6,925,533 B2 | 8/2005 | Lewis | 711/118 |
| 7,127,602 B1 | 10/2006 | Bekke et al. | |
| 7,356,679 B1 * | 4/2008 | Le et al. | 713/1 |
| 7,453,678 B2 * | 11/2008 | Beneditz et al. | 361/93.2 |
| 2002/0029326 A1 | 3/2002 | Reuter et al. | 711/206 |
| 2004/0172458 A1 * | 9/2004 | Pitts | 709/213 |
| 2005/0091376 A1 | 4/2005 | Helfman | 709/226 |
| 2005/0138346 A1 | 6/2005 | Cauthron | |
| 2005/0228903 A1 | 10/2005 | Lerner et al. | |
| 2005/0234846 A1 | 10/2005 | Davidson et al. | 707/1 |
| 2005/0289218 A1 | 12/2005 | Rothman et al. | 709/203 |
| 2006/0218544 A1 | 9/2006 | Chakraborty et al. | 717/168 |
| 2006/0225065 A1 | 10/2006 | Chandhok et al. | 717/168 |
| 2006/0282510 A1 * | 12/2006 | Preimesberger | 709/217 |
| 2007/0006218 A1 | 1/2007 | Vinberg et al. | 717/174 |
| 2008/0028034 A1 | 1/2008 | Currid et al. | |
| 2008/0028052 A1 * | 1/2008 | Currid et al. | 709/222 |
| 2008/0209196 A1 | 8/2008 | Hernandez et al. | |

OTHER PUBLICATIONS

"Virtualization with Microsoft® Windows Server™ 2003 R2, Enterprise Edition", Microsoft Corporation, Mar. 2006, http://download.microsoft.com, 11 pages.

"VMware Infrastructure 3, Data Center Management and Optimization Suite", VMware, http://www.virtualizeasap.com, 4 pages.

* cited by examiner

*Primary Examiner* — Laura Tso

(74) *Attorney, Agent, or Firm* — Woodcock Washburn LLP

(57) ABSTRACT

A system for the unified provisioning of virtual and physical disk images is created. The system includes a library of disk images. Client devices are able to upload to, and select disk images from the disk library. The library is able to determine the hardware requirements of a client device, and format the disk image accordingly. The library supports both virtual machine and physical computer systems, and is able to modify the stored disk image to accommodate either type of client device. The library can modify images to be bootable from a wide variety of storage device types, including iSCSI, and DAS, for example.

19 Claims, 4 Drawing Sheets

UNIFIED PROVISIONING OF PHYSICAL AND VIRTUAL IMAGES

BACKGROUND

Computers historically have booted from direct attached storage (DAS). With the advent of storage array networks (SANs) it is now possible to boot physical computers from disks in a SAN. With the advent of Virtual Machines it is possible to boot multiple virtual computer systems on a single physical computer from virtual disk images located on either on SAN or DAS storage. Furthermore, virtual machines may boot directly from 'pass thru' disks located on either SAN or DAS storage.

Some iSCSI target implementations use virtual disk images as the base storage for the SAN disks. Consequently, it is possible to have a physical machine booting from a directly attached disk. It is possible to have a virtual machine booting from a virtual disk image located on a directly attached disk. It is possible to have a physical machine boot from an iSCSI disk that is actually a virtual disk image on an iSCSI target. It is also possible to have a virtual machine boot directly from a physical 'pass thru' disk.

The configuration and management of these various boot images and methods is complex and the choice of what method to use may depend on the performance needs of the computer system.

SUMMARY

A system for the unified provisioning of virtual and physical disk images is created. The system includes a library of disk images. Client devices are able to upload to, and select disk images from the disk library. The library is able to determine the hardware requirements of a client device, and format the disk image accordingly. The library supports both virtual machine and physical computer systems, and is able to modify the stored disk image to accommodate either type of client device. The library can modify images to be bootable from a wide variety of storage device types, including iSCSI, and DAS, for example.

DETAILED DESCRIPTION

Figure 1:
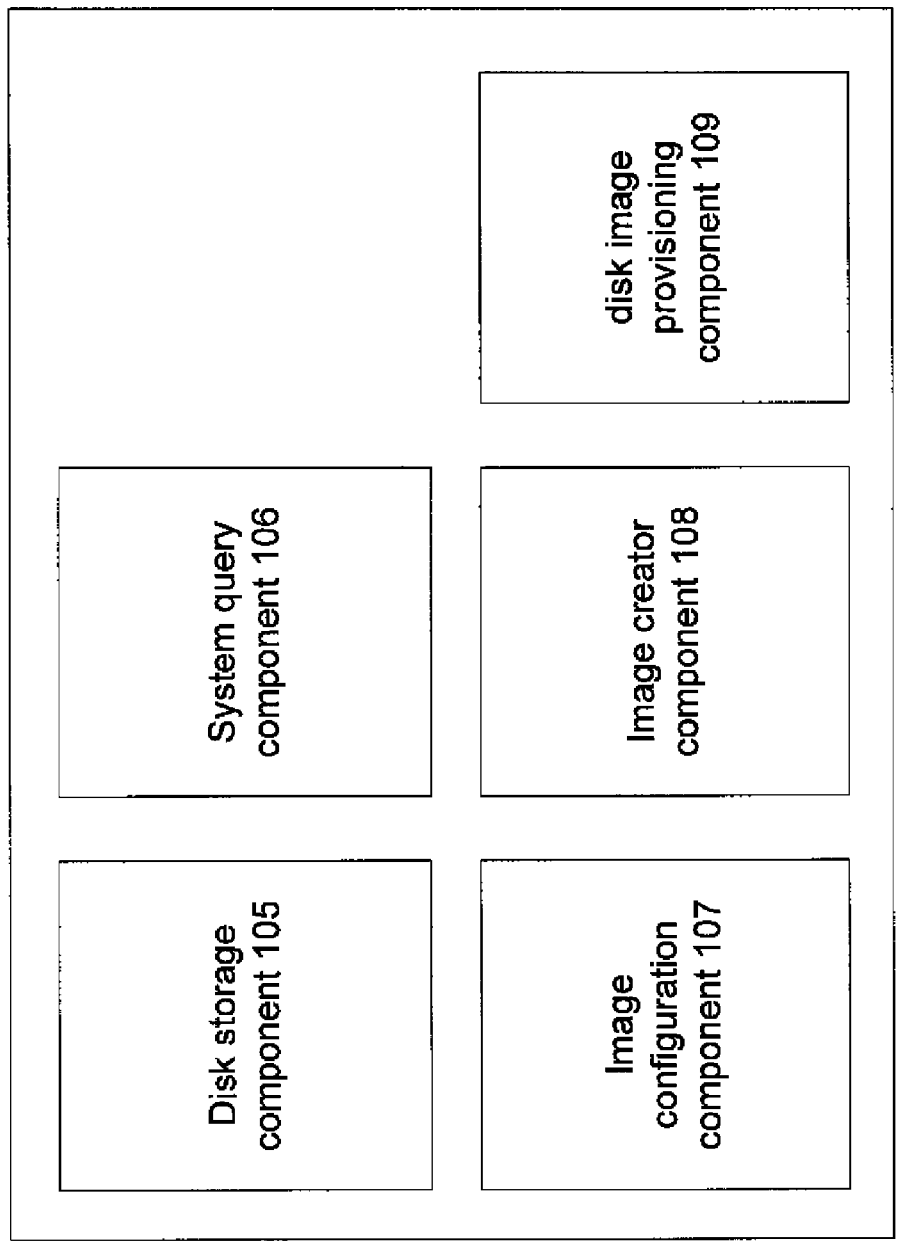
FIG. 1 is an illustration of an example system for the unified provisioning of disk images to physical and virtual systems.

FIG. 1 is an illustration of an example universal system 101 for provisioning disk images for use in both physical and virtual machines. The system may allow for the creation, manipulation, and management of a variety of both virtual and physical disk images, as well as provide for the ability to conFIG. other systems to boot these images.

The system 101 may comprise a single centralized server, or may comprise several servers working together. The server desirable comprises a disk storage component 105. The disk storage component 105 stores one or more physical or virtual machine images for provisioning to one or more client devices. The disk storage component 105 may be implemented using one or more local hard drives, or using iSCSI, for example. Any system, method, or technique in the art for disk storage may be used.

The system 101 may further comprise a system query component 106. The system query component 106 may query a target client computer to determine the hardware characteristics of a client computer or virtual machine. Any system, method, or technique for querying a computer to determine the physical or virtual hardware characteristics may be used, such as, for example, queries to a motherboard or chassis BMC (baseboard management controller) or queries to a hypervisor. In addition, where the client computer comprises one or more virtual machine, the system query component 106 may be further adapted to conFIG. the resources allotted to the virtual machine by the underlying hardware device. Any system, method, or technique for configuring a virtual machine may be used, such as, for example, the virtual machine configuration interfaces specified by the DMTF.

The system 101 may further comprise a image configuration component 107. The image configuration component 107 may conFIG. preexisting disk image files to be bootable by a selecting client or clients. Typically, this involves ensuring that the correct operating system kernel files and drivers are in the image. The selected physical image is made bootable by configuring it to match the selecting client as determined by the system query component 106.

In addition, the image configuration component may also conFIG. disk image files to be bootable by a virtual machine. It should be understood that the virtual machine has "homogeneous" hardware. For example, there is typically just one kind of disk controller, network controller, interrupt controller, etc. This makes configuring a virtual machine easier than configuring a physical machine because there is less variation. Another difference is that the virtual hardware is "configurable." That is, devices can be added programmatically.

The system 101 may further comprise an image creator component 108. The image creator component may receive disk images from client devices. In one embodiment, these images comprise VHD files and may be stored by the disk storage component 105. In another embodiment, these images are received in one of many known image file formats, such as a Raw copy of the disk, Ghost, and VMDK, for example. The images may then be converted into VHD format and stored for later use. In yet another embodiment, the image creator component 108 may generate the specified VHD from scratch based on criteria selected by the client. For example, the client may specify which applications and operating system that they desire, and the image creator component 108 may then construct one according to the specified characteristics. Any system, method, or technique known in the art for generating an image may be used.

The system 101 may further comprise a disk image provisioning component 109. The disk image provisioning component 109 may provision the generated disk image to the requesting client. In one embodiment, the image may be provisioned to the client via an iSCSI drive. In another embodiment, the image may be provisioned to a DAS drive connected to the physical client machine. Any storage solution known in the art may be supported.

Figure 2:
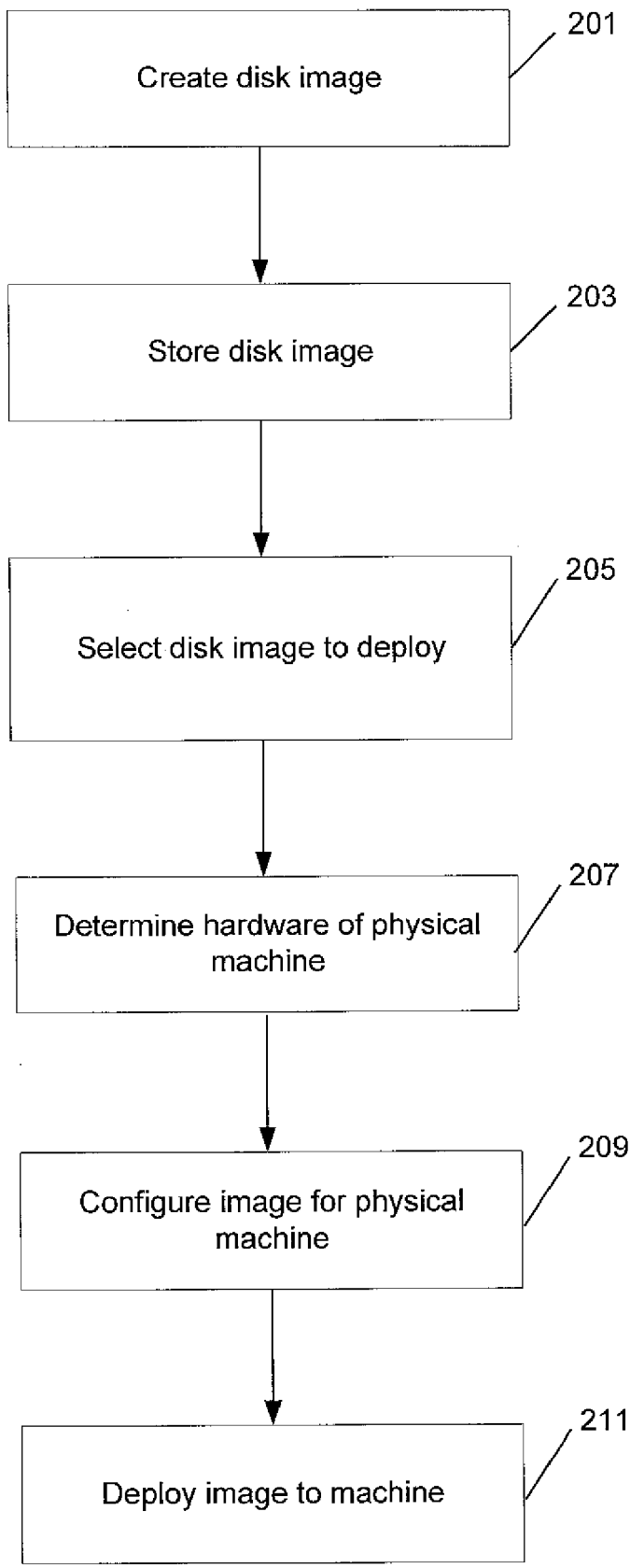
FIG. 2 is an illustration of an example method for provisioning a disk image to a physical system.

FIG. 2 is an illustration of a method for transitioning a an image to a physical computer. At 201, A disk image is created by a 'new image' creation tool. In one embodiment, the disk image is created from an existing computer system. In another embodiment, the disk image is created from a backup image. Any system, method, or technique for creating a disk image may be used.

At 203, the created disk image is stored in a library. The library may comprises a virtual machine image sever, for example. However, any system, method, or technique for storing a disk image known in the art may be used.

At 205, an administrator chooses a disk image to deploy to a machine. The administrator may select the image from the one or more images stored on the virtual machine server, for example. How the particular disk image is provisioned by the server may depend on the type of image selected, the type of machine selected, and whether the administrator desires the image to execute on the machine as a physical image or as a virtual machine.

At 207, a selected physical machine may be queried to determine its hardware characteristics. There are three main ways to do this. One is "out of band" where communication with the BMC is employed to inventory the hardware. Another is by booting some inventory software on the hardware that reports the inventory. Finally, the inventory may be specified by administrator data entry. Any system, method, or technique known in the art for querying a system for hardware characteristics may be used.

At 209, the hardware characteristics on the physical system are compared with predetermined hardware requirements of the physical image. There are three main ways to do this. First, the image may contain an application for which a "software model" exists. This "model" contains information about performance requirements. Second, the image may have historical data from being run before (e.g., this image uses 30% of an Intel P4 2.0 GHz processor). Third, the hardware requirements may be specified by administrator data entry. If the system meets the predetermined requirements of the physical image (e.g., sufficient RAM, processor speed, etc.), then the disk image is conFIG.d to be bootable on the physical computer system (e.g., by inserting the appropriate operating system files and drivers into the image).

At 211, after the image is conFIG.d, it may be copied to a DAS disk associated with the physical computer. The physical computer may then be conFIG.d to boot directly from the stored image on the DAS drive. Any system, method, or technique for configuring a boot device may be used.

In another embodiment the image is made available on a SAN disk accessible to the physical computer. The physical computer may then be conFIG.d to boot directly from the image stored on the SAN disk. Any system, method, or technique for configuring a boot device may be used.

In yet another embodiment, the image is made available directly to a disk drive in the physical computer. The physical computer may then be conFIG.d to boot directly from the locally stored image. Any system, method, or technique for configuring a boot device may be used.

Figure 3:
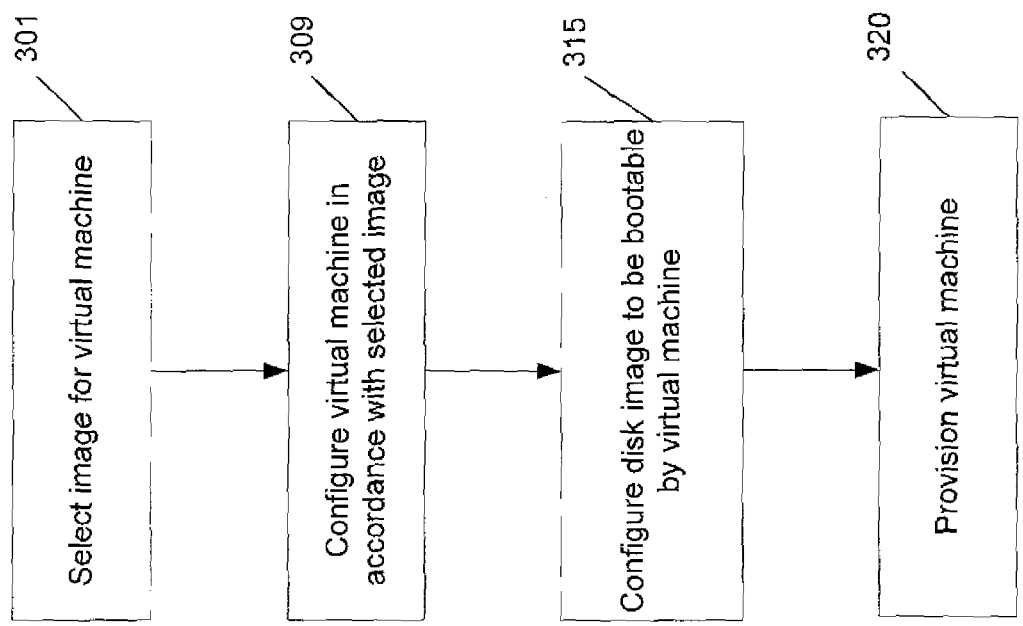
FIG. 3 is an illustration of an example method for provisioning a disk image to a virtual machine.

FIG. 3 is an illustration of an example method for transitioning a physical image to a virtual machine in accordance with the present invention. At 201, a disk image is selected to be executed on a virtual machine on a physical computer. The image may be selected from a virtual machine server, for example. However, any system, method or technique for storing and selecting virtual machine servers may be used.

At 309, the virtual machine executing at the physical computer is conFIG.d with the appropriate resources (e.g., number of processors amount or RAM, CPU speed, etc.) to execute the selected disk image. The appropriate amount of resources on the underlying physical machine are apportioned to the virtual machine. The virtual machine environment may then function as a computer comprising at least the specified resources. Any system, method, or technique for assigning system resources to a virtual machine may be used.

At 315, the disk image is conFIG.d to be bootable by the virtual machine. This may be accomplished by, for example, inserting the appropriate operating system files and drivers into the image. Any system, method, or technique known in the art for configuring virtual machine images may be used.

At 320, the virtual machine disk image is provisioned to the physical computer executing the virtual machine. In one embodiment, the image is copied to a DAS storage associated with the physical system. The virtual machine may then be conFIG.d to boot directly from the attached drive.

In another embodiment, the image is made available as a SAN disk. The virtual machine may then be conFIG.d to boot directly from the SAN disk image.

Example Computing Arrangement

Figure 4:
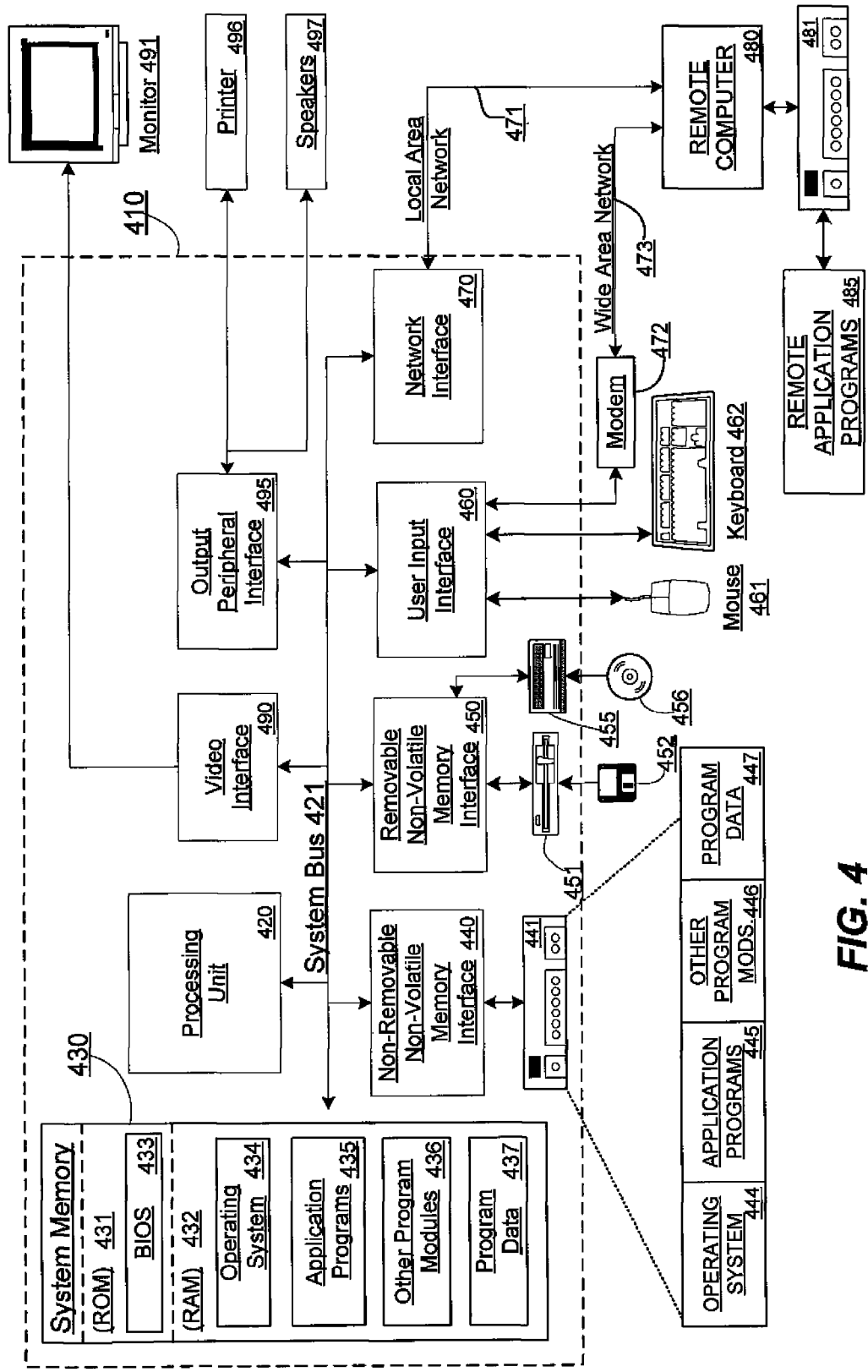
FIG. 4 is a block diagram of an example computing environment in which example embodiments and aspects may be implemented.

FIG. 4 shows an example computing environment in which example embodiments and aspects may be implemented. The computing system environment 400 is only one example of a suitable computing environment and is not intended to suggest any limitation as to the scope of use or functionality. Neither should the computing environment 400 be interpreted as having any dependency or requirement relating to any one or combination of components illustrated in the example operating environment 400.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system includes a general purpose computing device in the form of a computer 410. Components of computer 410 may include, but are not limited to, a processing unit 420, a system memory 430, and a system bus 421 that couples various system components including the system memory to the processing unit 420. The processing unit 420 may represent multiple logical processing units such as those supported on a multi-threaded processor. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 421 may also be implemented as a point-to-point connection, switching fabric, or the like, among the communicating devices.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 20 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are example and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method for configuring a disk image for a client by a server, comprising:
   receiving a request for the disk image by the server from the client comprising a virtual machine operating on the client;

determining the hardware characteristics of the client by the server wherein the virtual machine on the client is configured to have the resources needed to execute the disk image;

modifying the requested image to be bootable by the virtual machine operating on the client; and provisioning the modified image to the client.

2. The method of claim 1, wherein determining the hardware characteristics comprises querying the client for its hardware characteristics.

3. The method of claim 1, wherein the modified image is provisioned to the client via an iSCSI drive.

4. The method of claim 1, wherein the modified image is provisioned to the client via a DAS drive.

5. The method of claim 1, wherein the disk image is constructed for the virtual machine by the server.

6. The method of claim 1, further comprising the client loading a disk image to the server.

7. The method of claim 6, further comprising converting the disk image to a virtual hard drive image.

8. A computer-readable storage medium with computer-executable instructions stored thereon that upon execution by a computing device cause:

a request received for a disk image by a server from a client, comprising a virtual machine operating on the client, to be processed;

the hardware characteristics of the client to be determined by the server wherein the virtual machine on the client is configured to have the resources needed to execute the disk image;

the requested image to be modified to be bootable by the virtual machine operating on the client; and provisioning the modified image to the client.

9. The computer-readable medium of claim 8, wherein determining the hardware characteristics comprises querying the client for its hardware characteristics.

10. The computer-readable medium of claim 8, wherein the modified image is provisioned to the client via an iSCSI drive.

11. The computer-readable medium of claim 8, wherein the modified image is provisioned to the client via a DAS drive.

12. The computer-readable medium of claim 8, wherein the disk image is constructed for the virtual machine by the server.

13. The computer-readable medium of claim 8, further comprising the client loading a disk image to the server.

14. The computer-readable medium of claim 13, further comprising converting the disk image to a virtual hard drive image.

15. A system comprising:

a computing device comprising a processor;

a memory in communication with said computing device when the system is operational, the memory having stored thereon, instructions that upon execution by the computing device cause:

a request to be received for a disk image by a server from a client, comprising a virtual machine operating on the client, to be processed;

the hardware characteristics of the client to be determined by the server wherein the virtual machine on the client is configured to have the resources needed to execute the disk image;

the requested image to be modified to be bootable by the virtual machine operating on the client; and the modified image to be provisioned on the client.

16. The system of claim 15, wherein the instructions for causing the determination of the hardware characteristics comprise instructions for causing the querying of the client for its hardware characteristics.

17. The system of claim 15, wherein the disk image is constructed for the virtual machine by the server.

18. The system of claim 15, further comprising the client loading a disk image to the server.

19. The system of claim 15, further comprising instructions stored in the memory that upon execution by the computing device cause the conversion of the disk image to a virtual hard drive image.

\* \* \* \* \*